United States Patent [19]

Pralus

[11] Patent Number: 4,545,918

[45] Date of Patent: Oct. 8, 1985

[54] STABILIZATION OF AQUEOUS SOLUTIONS CONTAINING HYDROGEN PEROXIDE, HYDROFLUORIC ACID AND METAL IONS

[75] Inventor: Christian Pralus, Saint-Cyr-Au-Mont-D'Or, France

[73] Assignee: Atochem, France

[21] Appl. No.: 566,479

[22] Filed: Dec. 28, 1983

[30] Foreign Application Priority Data

Jan. 7, 1983 [FR] France ................................ 83 00210

[51] Int. Cl.$^4$ ........................... C11D 7/18; C11D 7/08
[52] U.S. Cl. ........................................ 252/142; 134/3; 134/41; 156/625; 252/79.3; 252/79.5; 252/186.28
[58] Field of Search ................. 106/3; 252/79.3, 79.5, 252/142, 186.28; 156/625; 134/3

[56] References Cited

U.S. PATENT DOCUMENTS

| | | | |
|---|---|---|---|
| 3,296,141 | 1/1967 | Lieb et al. | 252/79.3 |
| 3,756,957 | 9/1973 | Shiga | 252/79.4 |
| 3,841,905 | 10/1974 | Dixon, III | 427/96 |

FOREIGN PATENT DOCUMENTS 1383066 11/1964 France .
1472467 1/1967 France .

OTHER PUBLICATIONS

Chemical Abstracts, vol. 80, No. 14, Apr. 8, 1974, p. 157, Resume No. 73166v, Columbus, Ohio (U.S.) & JP-A-73 29 455, (Mitsubishi Gas Chemical Co., Inc.) (Sep. 10, 1974).

Chemical Abstracts, vol. 81, No. 2, Jul. 15, 1974, p. 92, Resume No. 5454h, Columbus, Ohio (U.S.) and JP-A-73 93 542, (Furukawa Electric Co., Ltd.) (Dec. 4, 1973).

Primary Examiner—Prince E. Willis
Attorney, Agent, or Firm—Sigalos & Levine

[57] ABSTRACT

Process for improving the stability of aqueous solutions containing hydrogen peroxide, metal ions and hydrofluoric acid which can be partially in the form of salts, comprising adding to the said solution at least one hydroxide selected from alkali metal hydroxides, ammonium hydroxide, or mixtures thereof in an amount which is insufficient to neutralize all the acidity present. The resultant novel stabilized solutions according to the invention are used in the surface treatment of metals especially of stainless steels.

8 Claims, No Drawings

STABILIZATION OF AQUEOUS SOLUTIONS CONTAINING HYDROGEN PEROXIDE, HYDROFLUORIC ACID AND METAL IONS

BACKGROUND OF THE INVENTION

The present invention relates to the stabilization of aqueous solutions containing hydrogen peroxide, hydrofluoric acid and metal ions, in which solutions the hydrofluoric acid may partially be in the form of salts.

Such solutions are used especially in the surface treatment of metals, such as cleaning or chemical polishing of stainless steels.

These solutions are unstable both during use, for example in the surface treatment of metals, and when left standing, since the metal ions which they contain catalyze the decomposition of the hydrogen peroxide.

Remedies for reducing the speed of this decomposition of hydrogen peroxide in solutions of the said type have been proposed.

For example, British Pat. No. 1,164,347 proposes adding one or more saturated aliphatic alcohols to an aqueous hydrogen peroxide solution containing hydrofluoric acid and used for the chemical polishing of copper and of its alloys.

U.S. Pat. No. 3,537,926 proposes the addition of an aromatic carboxylic or dicarboxylic acid, such as benzoic acid, to the aqueous acidic solutions containing hydrogen peroxide and ammonium bifluoride, $NH_4F$—$HF$, used in polishing iron alloys.

Japanese Patent Application Japan Kokai No. 73/52,638 claims the addition of urea and of an inorganic acid to aqueous hydrogen peroxide solutions containing hydrofluoric acid or its salts and employed for polishing iron and steels.

The remedies set out above for improving the stability of solutions comprising hydrogen peroxide, hydrofluoric acid in the free form or partially combined in the form of salts, such as ammonium bifluoride, and metal ions have the disadvantage that either their economics are unattractive or that they have adverse effects on the environment.

SUMMARY OF THE INVENTION

The present invention overcomes these disadvantages and provides a process for improving the stability of aqueous solutions containing hydrogen peroxide, metal ions and hydrofluoric acid which can be partially in the form of salts.

Briefly stated, the present invention comprises the method of stabilizing said solutions comprising adding to said solutions one or more hydroxides selected from the alkali metal hydroxides; such as sodium hydroxide and potassium hydroxide, ammonium hydroxide, and mixtures thereof in an amount which is insufficient to neutralize all the acidity present. The invention also comprises said stabilized solutions and their use to clean and/or polish the surface of metals.

DETAILED DESCRIPTION

The stabilizing effect of such an addition is very surprising. In fact, the alkali metal hydroxides or ammonium hydroxide are known to be, themselves, catalysts for the decomposition of hydrogen peroxide. Moreover, the extent of the stabilization achieved according to the invention is much greater than that which might be expected on assuming that the alkali metal hydroxide or hydroxides or ammonium hydroxide are converted, by reaction with hydrofluoric acid, into fluorides which are known to have complexing properties towards metal ions.

The total added amount of the said hydroxide is generally between about 0.1 and 2.0 moles per liter of solution containing the hydrogen peroxide; preferably between 0.2 and 1.0 mole per liter of this solution.

The respective concentrations of hydrogen peroxide and hydrofluoric acid in the aqueous solutions to which the invention is applicable are those conventionally used for solutions containing these two compounds and employed for the surface treatment of metals. Generally, the concentration of hydrogen peroxide in such solutions is between about 5 and 150 grams per liter and the concentration of hydrofluoric acid, in the free form or partially combined in the form of salts, expressed as total fluorine, is greater than 38 grams per liter.

The invention will now be further described in more detail in connection with the Examples which follow which are set forth for purposes of illustration only.

EXAMPLE 1

To an aqueous solution which contains, per liter 20 grams of hydrogen peroxide, hydrofluoric acid in an amount corresponding to 73.2 grams of total fluorine, 29.3 grams of total iron, 5.98 grams of total chromium, 0.13 grams of total manganese, 0.07 gram of total nickel and 0.0086 gram of total copper, and in which the average rate of decomposition of the hydrogen peroxide, measured at 26° C. over a period of 2 hours, is 0.90 millimole per minute and per liter, there is added sodium hydroxide, NaOH, so as to give a concentration of 0.44 mole of NaOH per liter of solution.

The mean rate of decomposition of the hydrogen peroxide, determined as above, is thereafter no more than 0.48 millimole per minute and per liter, that is to say about half that found without addition of sodium hydroxide.

The same result is obtained if the sodium hydroxide is replaced by the same molar amount of potassium hydroxide (KOH) or ammonium hydroxide ($NH_4OH$).

EXAMPLE 2

To the same solution as in Example 1 there is added sodium hydroxide so as to give 0.66 mole of NaOH per liter of solution.

The mean rate of decomposition of the hydrogen peroxide, measured as in Example 1, is then 0.36 millimole per minute and per liter of solution, namely less by a factor of 2.5 than that found in the absence of sodium hydroxide.

EXAMPLE 3

To the solution of Example 1 there is added sodium hydroxide so as to give 0.22 mole of NaOH per liter of solution. The mean rate of decomposition of the hydrogen peroxide, measured as in Example 1, is then 0.56 millimole per minute and per liter of solution, and hence lower by a factor of 1.6 than that found without addition of sodium hydroxide.

EXAMPLE 4

To an aqueous solution which contains, per liter, 20 grams of hydrogen peroxide, hydrofluoric acid in an amount corresponding to 104.5 grams of total fluorine, 60 grams of total iron, 12.1 grams of total chromium, 0.21 gram of total manganese, 0.11 gram of total nickel and 0.015 gram of total copper, and in which the mean rate of decomposition of the hydrogen peroxide, determined as in Examples 1, is 1.80 millimoles per minute and per liter, there is added sodium hydroxide so as to give 0.44 mole of NaOH per liter of solution. The mean rate of decomposition of the hydrogen peroxide, measured as in Example 1, is then 0.88 millimole per minute and per liter, and hence about half that found without addition of sodium hydroxide.

EXAMPLE 5

To the solution of Example 2 there is added ammonium hydroxide ($NH_4OH$) to give 0.96 mole of $NH_4OH$ per liter of solution. The mean rate of decomposition of the hydrogen peroxide, measured under the conditions defined in Example 1, is then 0.64 millimole per minute and per liter, and hence lower by about a factor of three than that found without addition of ammonium hydroxide.

EXAMPLE 6

To the solution of Example 4 there is added ammonium hydroxide so as to give 0.44 mole of $NH_4OH$ per liter of solution. The mean rate of decomposition of the hydrogen peroxide, measured as in Example 4, is then 0.9 millimole per minute and per liter of solution, and hence half that found without addition of ammonium hydroxide. This result, when compared to that of Example 4, confirms that sodium hydroxide and ammonium hydroxide have equivalent effects, as already found in Example 1.

EXAMPLE 7

To the solution of Example 4 there is added sodium fluoride (NaF) so as to give 0.44 mole of NaF per liter of solution. The mean rate of decomposition of the hydrogen peroxide, measured as in Example 4, is then 1.1 millimoles per minute and per liter of solution, and hence lower by a factor of 1.64 than that found without addition of sodium fluoride, but higher by a factor of 1.25 than that found if only the same molar amount of sodium hydroxide is added.

EXAMPLE 8

To an aqueous solution which contains, per liter, 20 grams of hydrogen peroxide, 112.9 grams of total fluorine, corresponding to hydrofluoric acid in the free form or partially combined in the form of salts, 0.44 mole thereof being ammonium fluoride ($NH_4F$), and the same amounts of total iron, total chromium, total manganese, total nickel and total copper as in Example 4, and in which the mean rate of decomposition of the hydrogen peroxide, measured as in the preceding examples, is 1.2 millimoles per minute and per liter, there is added ammonium hydroxide so as to give 0.44 mole of $NH_4OH$ per liter of solution. The mean rate of decomposition of the hydrogen peroxide, measured as in the preceding examples, is then 0.88 millimole per minute and per liter, which is lower by a factor of about 1.4 than that found without addition of ammonium hydroxide.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

What is claimed is:

1. The process for improving the stability of an aqueous solution used to treat metal surfaces and containing hydrogen peroxide, metal ions and hydrofluoric acid which can be partially in the form of salts, which comprises adding to the said solution at least one hydroxide selected from alkali metal hydroxides, ammonium hydroxide, and mixtures thereof in an amount which is insufficient to neutralize all the acidity present such that said hydrofluoric acid is at a concentration, expressed as total fluoride, of more than 38 grams per liter.

2. The process of claim 1, wherein the amount of the said hydroxide is between about 0.1 and 2 moles per liter of solution.

3. The process of claims 1 or 2, wherein said solution contains hydrogen peroxide at a concentration of between about 5 and 150 grams per liter.

4. A stabilized aqueous solution for the surface treatment of metals comprising hydrogen peroxide, metal ions and hydrofluoric acid which can be partially in the form of salts; all in an amount sufficient for said surface treatment, and a stabilizer comprising at least one hydroxide selected from an alkali metal hydroxide, ammonium hydroxide, or mixtures thereof in an amount which is insufficient to neutralize all the acidity present in said solution such that said hydrofluoric acid is at a concentration, expressed as total fluoride, of more than 38 grams per liter.

5. The stabilized aqueous solution of claim 4 wherein the amount of said hydroxide is between about 0.1 and 2 moles per liter of solution.

6. The stabilized aqueous solution of claims 4 or 5 wherein said solution contains hydrogen peroxide at a concentration of between about 5 and 150 grams per liter.

7. The process of treating the surface of metals to clean or chemically polish the same comprising applying thereto the solution of claim 4.

8. The process of claim 7 wherein said metal is a stainless steel.

* * * * *